United States Patent [19]

Bennett

[11] Patent Number: 4,975,951

[45] Date of Patent: Dec. 4, 1990

[54] IPPV PROGRAMMING DISTRIBUTION CONTROL SYSTEM

[75] Inventor: Christopher J. Bennett, San Diego, Calif.

[73] Assignee: General Instrument Corporation, New York, N.Y.

[21] Appl. No.: 488,472

[22] Filed: Feb. 26, 1990

Related U.S. Application Data

[63] Continuation of Ser. No. 255,117, Oct. 7, 1988, abandoned.

[51] Int. Cl.$^5$ .................. H04N 7/167; H04N 7/00; H04L 9/00
[52] U.S. Cl. .......................... 380/20; 380/10; 380/16; 455/2; 364/238.1; 364/222.3; 358/84
[58] Field of Search ............... 364/238.1, 222.3; 380/10, 16, 20; 358/84; 455/2

[56] References Cited

U.S. PATENT DOCUMENTS

| | | |
|---|---|---|
| 4,256,926 | 3/1981 | Pitroda et al. |
| 4,334,126 | 6/1982 | Slingsby . |
| 4,518,824 | 5/1985 | Mondardini . |
| 4,672,602 | 6/1987 | Hargrave et al. |
| 4,709,266 | 11/1987 | Hanas et al. ............ 380/20 |
| 4,712,238 | 12/1987 | Gilhousen et al. ...... 380/20 |
| 4,751,732 | 6/1988 | Kamitake ................ 380/20 |
| 4,797,918 | 1/1989 | Lee et al. ................ 380/20 |
| 4,829,569 | 5/1989 | Smith et al. ............ 380/10 |
| 4,833,710 | 5/1989 | Hirashima .............. 380/20 |

Primary Examiner—Stephen C. Buczinski
Attorney, Agent, or Firm—Edward W. Callan

[57] ABSTRACT

A distribution control system for controlling the distribution of scrambled impulse pay per view (IPPV) programming from a plurality of different IPPV programmers to a plurality of descramblers. The system includes a plurality of business data processing systems, a plurality of channel control systems respectively related to a plurality of the given IPPV programmers and an IPPV management system. The business data processing systems process view history data identifying descrambled IPPV programs and credit data for individual descramblers and cost data for IPPV programs provided by given IPPV programmers and provide credit data and IPPV authorization data pertaining to individual descramblers. Each of the channel control systems provides descrambler messages containing identification, cost and IPPV status data for individual IPPV programs. The IPPV data management system processes the credit data and IPPV authorization data provided by the business data processing systems to provide descrambler messages unique to each descrambler containing credit data and IPPV authorization data pertaining to the individual descrambler. The IPPV management system also sorts the IPPV program identification and cost data provided the channel control systems in accordance with which business data processing systems process data for those IPPV programs provided by the respective given IPPV programmers, and sorts view history data provided by the descramblers in accordance with which business data processing systems process data for the respective descramblers for the IPPV programmers that provide the IPPV programs identified in the view history data provided by the respective descramblers; and forwards the sorted IPPV program identification and cost data and the sorted view history data to the respective business data processing systems.

9 Claims, 3 Drawing Sheets

IPPV PROGRAMMING DISTRIBUTION CONTROL SYSTEM

This is a continuation of co-pending application Ser. No. 07/255,117 filed on Oct. 7, 1988, now abandoned.

BACKGROUND OF THE INVENTION

The present invention generally pertains to the distribution of scrambled impulse pay per view (IPPV) programs and is particularly directed to controlling the distribution of IPPV programs from a plurality of different IPPV programmers to a plurality of descramblers that are authorized for descrambling the IPPV programs by respectively different business data processing systems.

A prior art IPPV distribution control system is described in U.S. Pat. No. 4,712,238 to Klein S. Gilhousen, Michael V. Harding, Jerrold A. Heller and Robert D. Blakeney, II. In the system described therein, an individual descrambler is authorized to descramble an individual IPPV program upon processing cost data for the program and credit data for the descrambler and upon processing IPPV status data for the program and authorization data for the descrambler.

SUMMARY OF THE INVENTION

The present invention is a distribution control system for controlling the distribution of scrambled impulse pay per view (IPPV) programming from a plurality of different IPPV programmers to a plurality of descramblers that individually may be authorized to descramble an individual IPPV program upon processing of cost data for the program and credit data for the descrambler and upon processing of IPPV status data for the program and authorization data for the descrambler, and that individually provide view history data identifying descrambled IPPV programs. The IPPV programming distribution control system of the present invention includes a plurality of business data processing systems, a plurality of channel control systems respectively related to a plurality of the given IPPV programmers, and an IPPV management system.

The business data processing systems process view history data identifying descrambled IPPV programs and credit data for individual descramblers and cost data for IPPV programs provided by given IPPV programmers and provide credit data and IPPV authorization data pertaining to individual descramblers. Each of the channel control systems provides descrambler messages containing identification, cost and IPPV status data for individual IPPV programs. The IPPV data management system processes the credit data and IPPV authorization data provided by the business data processing systems to provide descrambler messages unique to each descrambler containing credit data and IPPV authorization data pertaining to the individual descrambler. The IPPV data management system also sorts the IPPV program identification and cost data provided by the channel control systems in accordance with which business data processing systems process data for those IPPV programs provided by the respective given IPPV programmers, and sorts view history data provided by the descramblers in accordance with which business data processing systems process data for the respective descramblers for the IPPV programmers that provide the IPPV programs identified in the view history data provided by the respective descramblers; and forwards the sorted IPPV program identification and cost data and the sorted view history data to the respective business data processing systems.

Each of the business data processing systems may be operated by a separate business entity that contracts with given IPPV programmers and owners of individual descramblers to authorize the individual descramblers to descramble the IPPV programming provided by the given IPPV programmers. The IPPV programming distribution control system of the present invention allows the view history data of a given descrambler pertaining to programs provided by one given IPPV programmer to be restricted from the business entities that do not operate the business data processor that provides authorization data pertaining to IPPV programming of the one given IPPV programmer for the individual descrambler. Accordingly, the system of the present invention provides centralized authorization of different individual descramblers for receiving IPPV programming provided by different IPPV programmers without making the view history data of an individual descrambler pertaining to a given IPPV programmer accessible to business entities that do not operate the business data processing system that authorizes the individual descrambler to descramble IPPV programming provided by the given IPPV programmer.

In one aspect of the present invention, the IPPV data management system sorts view history data in accordance with a scheme wherein the view history data from a given descrambler for a given IPPV programmer is reported to only one business data processing system.

In another aspect of the present invention, a plurality of said IPPV data management systems are coupled to said plurality of business system processing systems and said plurality of channel control systems; and all data pertaining to any given descrambler is processed by a single said IPPV data management system.

In still another aspect of the present invention, wherein the system is adapted for controlling the distribution of IPPV programming to descramblers that individually may be authorized to descramble a given IPPV program upon processing of cost data for the program and credit data for the descrambler only when said IPPV status data identifies the given IPPV program as being authorized for purchase and the authorization data for the descrambler indicates that purchase of IPPV programs provided by the programmer providing said given IPPV program is authorized, each of the individual descrambler messages provided by the IPPV data management system contains a plurality of tier authorization bits, with the position of each bit identifying a tier of IPPV programs and each bit indicating whether purchase by the individual descrambler is authorized for the tier of IPPV programs identified by such bit; and the descrambler messages provided by a plurality of the channel control systems for a respective plurality of different IPPV programmers each contains an IPPV status bit in a respectively different position for processing with the tier authorization bits of the individual descrambler message, with each IPPV status bit indicating whether or not purchase of IPPV programming provided by the respective IPPV programmer is authorized.

Additional features of the present invention are described in relation to the description of the preferred embodiments.

DESCRIPTION OF THE PREFERRED EMBODIMENTS

Figure 1:
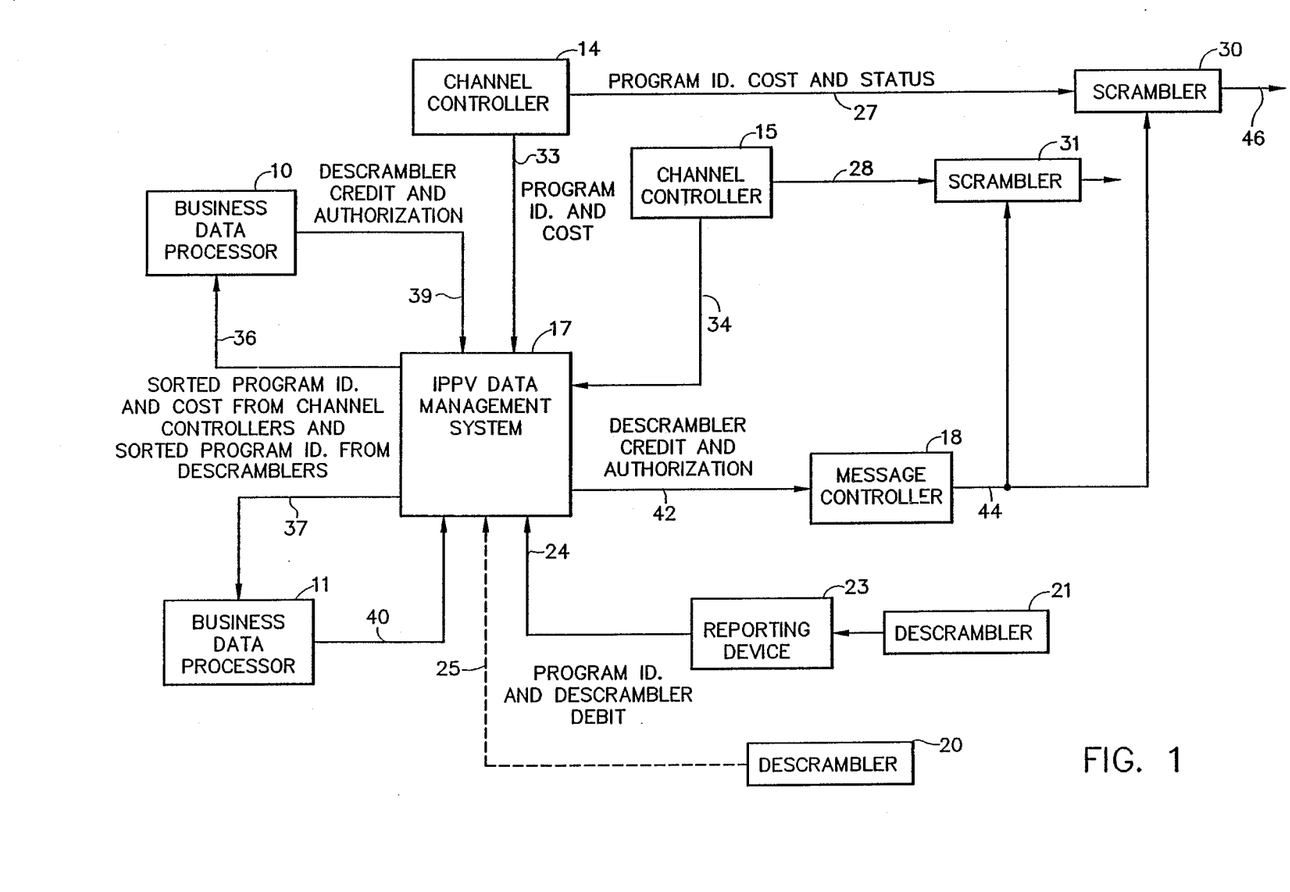
FIG. 1 is a block diagram of one preferred embodiment of the system of the present invention.

Referring to FIG. 1, one preferred embodiment of the IPPV programming distribution control system of the present invention includes a plurality of business data processors 10, 11; a plurality of channel controllers 14, 15, an IPPV management system 17, and a message controller 18.

The distribution control system of FIG. 1 controls the distribution of scrambled impulse pay per view (IPPV) programming from a plurality of different IPPV programmers to a plurality of descramblers 20, 21 that individually may be authorized to descramble an individual IPPV program upon processing of cost data for the program and credit data for the descrambler and upon processing of IPPV status data for the program and authorization data for the descrambler. The descramblers 20, 21 may be of the type described in the aforementioned U.S. Pat. No. 4,712,238. However, an improved version that is adapted for processing a plurality of tiers of IPPV authorization data is preferred.

Each descrambler 20, 21 individually provides debit data indicating the cost of descrambled IPPV programs and view history data identifying descrambled IPPV programs. This descrambler-provided data is communicated to the IPPV data management system 17, either directly by a reporting device 23 connected to the descrambler 21 and line 24, or indirectly 25. Such indirect communication may be as described in U.S. Pat. No. 4,712,238, or by use of a portable memory device into which the descrambler-provided data is stored from the descrambler 20 and from which the descrambler-provided data is retrieved and loaded into the IPPV data management system 17. The reporting device 23 may be of the type described in U.S. patent application No. 07/123,568 filed Nov. 20, 1987 by Christopher John Bennett, the inventor of the present invention. Alternatively the reporting device 23 may of the type that responds to a polling signal transmitted to the descrambler 21.

Each of the channel controllers 14, 15 is operated by a different IPPV programming provider. An IPPV programmer may offer material on more than one channel. Each of the channels controllers 14, 15 respectively provides descrambler messages containing identification, cost and IPPV status data for individual IPPV programs. These descrambler messages are authenticated and provided over lines 27, 28 to scramblers 30, 31 that are operated by the respective IPPV programming providers. The descrambler messages provided on lines 27 and 28 are first processed by the respective controllers 14, 15 to authenticate such messages for transmission to the descramblers 20, 21. Such authentication processing is described in U.S. Pat. No. 4,712,238 in the description of the processing of the cost signal and the program mask for inclusion in a channel rekey message.

The channel controllers 14, 15 also provide such IPPV program and cost identification data to the IPPV data management system 17 via lines 33, 34.

Figure 3:
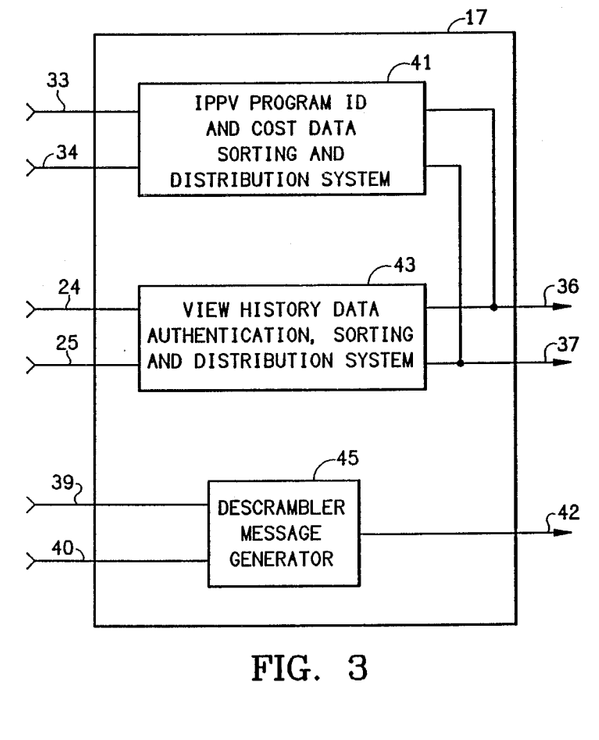
FIG. 3 is a block diagram of the IPPV data management system 17 of FIGS. 1 and 2.

The IPPV data management system 17 includes an IPPV program identification and cost data sorting and distribution system 41, a view history data authentication, sorting and distribution system 43 and a descrambler message generator 45, as shown in FIG. 3.

The IPPV data program identification and cost data sorting and distribution system 41 sorts the IPPV program identification and cost data provided by the channel controllers 14, 15 in accordance with which business data processors 10, 11 process data for those IPPV programs provided by the respective given IPPV programmers, and the view history data authentication, sorting and distribution system 43 sorts view history data provided by the descramblers 20, 21 in accordance with which business data processors 10, 11 process data for the respective descramblers 20, 21 for the IPPV programmers that provide the IPPV programs identified in the view history data provided by the respective descramblers 20, 21. The view history data authentication, sorting and distribution system 43 sorts the view history data in accordance with a scheme wherein the view history data from a given descrambler 20, 21 for a given IPPV programmer is reported to only one business data processor 10, 11.

The IPPV program identification and cost data sorting and distribution system 41 forwards the sorted IPPV program identification to the respective business data processors via lines 36, 37. The view history data authentication, sorting and distribution system 43 forwards cost data and the sorted view history data to the respective business data processors via lines 36, 37.

Each business data processor 10, 11 processes view history data and credit data for individual descramblers 20, 21 and cost data for IPPV programs provided by given IPPV programmers and provides credit data and IPPV authorization data pertaining to individual descramblers 20, 21 via lines 39, 40 to the descrambler message generator 45.

Each of the business data processors 10, 11 is operated by a separate business entity that contracts with given IPPV programmers and owners of individual descramblers 20, 21 to authorize the individual descramblers to descramble the IPPV programming provided by the given IPPV programmers. Each of the business data processors 10, 11 maintains an account balance for each individual descrambler 20, 21 for which it authorizes descrambling of IPPV programming. Credits are added to the account balance for payments and for credit advances attributed to the owner of such individual descramblers 20, 21. Debits are subtracted from the account balance for charges incurred for descrambled IPPV programming. Such debits are computed by the business data processor 10, 11 by correlating the IPPV program identification data included in the view history data received from the individual descrambler 20, 21 via the view history data authentication, sorting and distribution system 43 with the cost data for the identified IPPV program, as provided to the business data processor 10, 11 via the IPPV program identification and cost data sorting and distribution system 41 from the channel controller 14, 15 for the identified IPPV program.

For example, the business data processor 10 authorizes the descrambler 20 to descramble IPPV programming provided by the IPPV programmer that operates the channel controller 14. The business data processor 10 receives view history data indicating that the descrambler 20 has descrambled IPPV program No. 101 provided by the IPPV programmer that operates the channel controller 14. The business data processor 10 also receives data from the channel controller 14 (via the IPPV program identification and cost data sorting and distribution system 41 indicating the cost of descrambling IPPV program No. 101. With such received data, the business data processor 10 debits the account balance of the owner of descrambler 20 by the cost of descrambling IPPV program No. 101. The account balances for the respective descramblers 20, 21 that are maintained by the business data processors 10, 11 are used for billing the owners of the descramblers 20, 21.

The descrambler message generator 45 processes the credit data and IPPV authorization data provided by the business data processors 10, 11 to provide descrambler messages on line 42 that are unique to each descrambler and contain credit data and IPPV authorization data pertaining to the individual descrambler 20, 21. The descrambler message generator 45 maintains an accumulated credit balance for each individual descrambler 20, 21. Credit data received from the business data processors 10, 11 indicating a payment attributed to the owner of an individual descrambler 20, 21 causes the accumulated credit balance to be incremented in the amount of such payment. The accumulated credit is further adjusted either upward or downward in accordance with advanced credit data received from all of the business data processors 10, 11. The IPPV data management system 17 makes such adjustment in accordance with a predetermined criteria. For example, the adjustment may be made by the amount of the sum of the credit advances indicated in the credit data received from the different business data processors 10, 11; or the adjustment may be made by the amount of the lowest credit advance indicated in the credit data received from the different business data processors 10, 11.

The view history data authentication, sorting and distribution system 43 authenticates the debit data provided by the descramblers 20, 21. When the debit data is provided indirectly 25, such authentication is accomplished in the manner described in U.S. Pat. No. 4,712,238. When the debit data is provided directly over line 24, such authentication is accomplished by comparing the debit data with debit data calculated by processing the descrambling program identification data in the view history with the cost data for the identified programs that is provided by the channel controllers 14, 15.

The system of the present invention is used to control the distribution of IPPV programming to descramblers 20, 21 that individually may be authorized to descramble a given IPPV program upon processing of cost data for the program and credit data for the descrambler 20, 21 only when the IPPV status data identifies the given IPPV program as being authorized for purchase and the authorization data for the descrambler indicates that purchase of IPPV programs provided by the programmer providing said given IPPV program is authorized. Each of the individual descrambler messages provided by the descrambler message generator 45 contain a plurality of tier authorization bits, with the position of each bit identifying a tier of IPPV programs and each bit indicating whether purchase by the individual descrambler 20, 21 is authorized for the tier of IPPV programs identified by such bit. In one such embodiment, the descrambler messages provided by a plurality of the channel controllers 14, 15 for a respective plurality of different IPPV programmers each contains an IPPV status bit in a respectively different position for processing with the tier authorization bits of the individual descrambler message, with each IPPV status bit indicating whether or not purchase of IPPV programming provided by the respective IPPV programmer is authorized. A business data processor 10, 11 can authorize an individual descrambler 20, 21 for any number of tiers; and a given descrambler can be authorized by any number of business data processors 10, 11 for a given tier if there is duplication of in IPPV programming packages sold by business entities operating different business data processors 10, 11.

In another embodiment, the descrambler messages provided by a group of the channel controllers 14, 15 contain an IPPV status bit in a position for processing with a common one of the tier authorization bits of the individual descrambler message, with the IPPV status bit indicating whether or not purchase of an IPPV program is authorized. This enables the IPPV programming distribution control system to accommodate a greater number of channel controllers 14, 15 than the number of tier authorization bit positions in the descrambler message provided by the descrambler message generator 45.

The descrambler messages provided on line 42 are processed by the message controller 18 to authenticate such messages for transmission to the descramblers 20, 21. Such authentication processing is described in U.S. Pat. No. 4,712,238 in the description of the processing of the credit signal and the authorization word for inclusion in a category rekey message. The authenticated descrambler messages are provided on line 44 to each of the scramblers 30, 31 for the different IPPV programmers. Each scrambler 30, 31 includes the authenticated descrambler messages received on lines 27, 28 from the channel controllers and on line 44 from the message controller 18 in scrambled programming signals 46 that are transmitted to the descramblers 20, 21, as described in U.S. Pat. No. 4,712,238.

Figure 2:
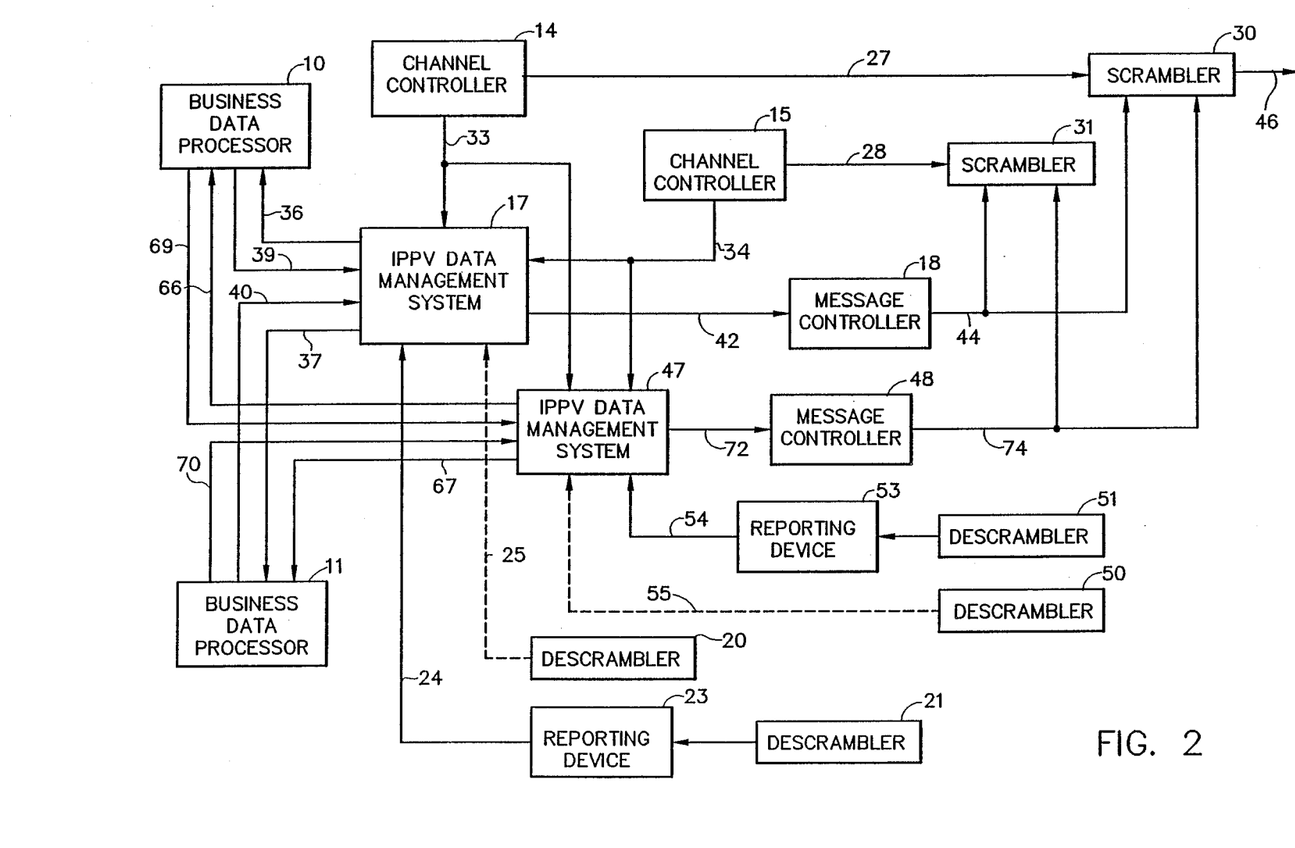
FIG. 2 is a block diagram of another preferred embodiment of the system of the present invention.
Figure 4:
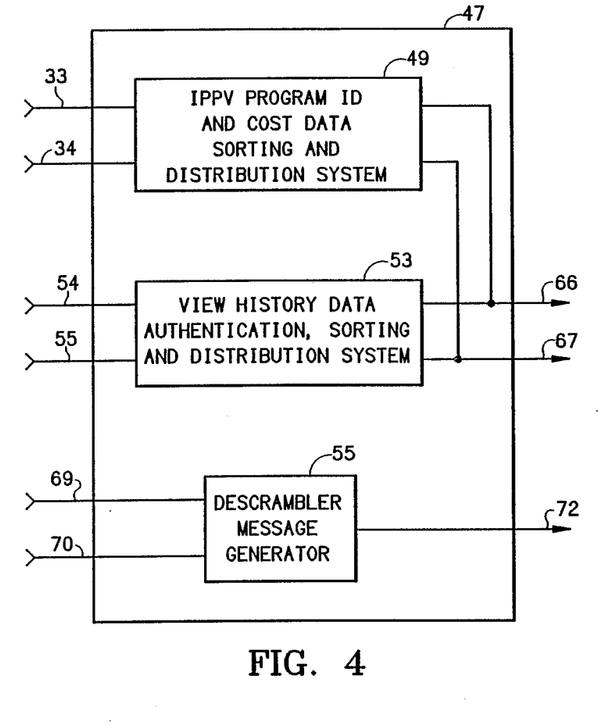
FIG. 4 is a block diagram of the IPPV data management system 47 of FIG. 2.

In an alternative preferred embodiment, as shown in FIG. 2, a plurality of IPPV data management systems 17, 47 are coupled to the plurality of business data processors 10, 11 and the plurality of channel controllers 14, 15. The IPPV data management system 47 includes an IPPV program identification and cost data sorting and distribution system 49, a view history data authentication, sorting and distribution system 52 and a descrambler message generator 56, as shown in FIG. 4. This embodiment is used for controlling the distribution of IPPV programming to both the first set of descramblers 20, 21, and a second set of descramblers 50, 51. In this embodiment, all data pertaining to any given descrambler 20, 21, 50, 51 is processed by a single said IPPV data management system 17, 47. Accordingly, all data pertaining to the first set of descramblers 20, 21 is processed by one IPPV data management system 17; and all data pertaining to the second set of descramblers is processed by the other IPPV data management system 47. In this embodiment, the operation of the business data processors 10, 11, the channel controllers 14, 15, the IPPV data management system 17, the message controller 18 and the descramblers 20, 21 with respect to each other is the same as in the embodiment described with reference to FIG. 1.

Each descrambler 50, 51 individually provides debit data indicating the cost of descrambled IPPV programs and view history data identifying descrambled IPPV programs. This descrambler-provided data is communicated to the view history data authentication, sorting and distribution system 52, either directly by a reporting device 53 connected to the descrambler 51 and line 54, or indirectly 55.

The channel controllers 14, 15 also provide such IPPV program and cost identification data to the IPPV program identification and cost data sorting and distribution system 49 via lines 33, 34.

The IPPV program identification and cost data sorting and distribution system 49 sorts the IPPV program identification and cost data provided by the channel controllers 14, 15 in accordance with which business data processors 10, 11 process data for those IPPV programs provided by the respective given IPPV programmers, and the view history data authentication, sorting and distribution system 52 sorts view history data provided by the descramblers 50, 51 in accordance with which business data processors 10, 11 process data for the respective descramblers 50, 51 for the IPPV programmers that provide the IPPV programs identified in the view history data provided by the respective descramblers 50, 51. The view history data authentication, sorting and distribution system 52 sorts the view history data in accordance with a scheme wherein the view history data from a given descrambler 50, 51 for a given IPPV programmer is reported to only one business data processor 10, 11.

The IPPV program identification and cost data sorting and distribution system 49 forwards the sorted IPPV program identification to the respective business data processors via lines 66, 67. The view history data authentication, sorting and distribution system 52 forwards cost data and the sorted view history data to the respective business data processors via lines 66, 67.

Each business data processor 10, 11 processes view history data and credit data for individual descramblers 50, 51 and cost data for IPPV programs provided by given IPPV programmers and provides credit data and IPPV authorization data pertaining to individual descramblers 50, 51 via lines 69, 70 to the descrambler message generator 56.

Each of the business data processors 10, 11 maintains an account balance for each individual descrambler 50, 51 for which it authorizes descrambling of IPPV programming in the same manner as the account balances are maintained for the individual descramblers 20, 21.

The descrambler message generator processes the credit data and IPPV authorization data provided by the business data processors 10, 11 to provide descrambler messages on line 72 that are unique to each descrambler and contain credit data and IPPV authorization data pertaining to the individual descrambler 50, 51. The descrambler message generator 45 maintains an accumulated credit balance for each individual descrambler 50, 51 in the same manner as the descrambler message generator 45 maintains accumulated credit balances for the individual descramblers 20, 21.

The view history data authentication, sorting and distribution system 52 authenticates the debit data provided by the descramblers 50, 51 in the same manner as the view history data authentication, sorting and distribution system 52 authenticates the debit data provided by the descramblers 20, 21.

The descrambler message generators 45, 56 also generate polling messages to be sent to the descramblers 20, 21, 50, 51. The polling messages are provided to the scramblers 30, 31 by the respective message controllers 42, 72.

The business data processors 10, 11 perform the subscriber account management functions for the IPPV programmers. Unlike subscription programming, where a consumer may be authorized from several business systems simultaneously, an IPPV programmer should authorize a given consumer through only a single business data processor 10, 11. Otherwise the view history data for a given individual descrambler pertaining to that IPPV programmer would have to be uploaded to several business data processors 10, 11, which would cause multiple bills to be generated. An IPPV programmer may authorize descramblers through more than one business data processor 10, 11 (e.g. one for East coast subscribers and one for West coast subscribers). However, it is preferred that IPPV authorization for any given programmer is only available through one business data processor 10, 11. The complication introduced is one of correctly managing deauthorization by determining which business data processor 10, 11 receives the view history data if there is more than one business data processor authorizing a given IPPV programming descrambling service by the individual descrambler, and, for whatever reason, the subscriber is not known to be authorized for the service.

Although several business data processors 10, 11 can be associated with a given IPPV programmer, and it is only necessary to ensure that at most one business data processor 10, 11 offers a given IPPV programming service to any individual descrambler.

Any IPPV program can be offered for sale by at most one IPPV provider. If a program was offered by two provides simultaneously on the same channel, and a consumer subscribing to both of them bought that program, there is no way to tell which programmer should be paid. Thus, any purchasable program has only one IPPV tier associated with it. Normally, this tier is the only IPPV authorization tier used on that particular channel. This is not a necessary assumption. In systems where a business entity is providing IPPV programs from more than one IPPV programmer, there would be more than one IPPV authorization tier used on the channel. If the view history does not identify the authorization tier, it is necessary for the view history data authentication, sorting and distribution system 43, 52 to be given a log by the channel controllers 14, 15 showing which IPPV programmer supplied a given IPPV program to a given business data processor 10, 11, so that the view history data authentication, sorting and distribution system 43, 52 it can disburse view history data only to the business data processor(s) 10, 11 that are operated by business entities that are authorized to act for that IPPV programmer.

The view history data authenication, sorting and distribution system 43, 52 maintains a table showing which business data processors 10, 11 are associated with a given IPPV programmer, and this table is used to determine which business data processor 10, 11 receives a given view history record.

Each channel controller 14, 15 maintains a record of which IPPV authorization tier is related to the channel controller 14, 15 and a database of past IPPV programs.

The channel rekey messages generated on lines 27, 28 by the channel controllers 14, 15 set the IPPV tier which is authorized for the respective channel. On subscription programs, this announces to the VC2-prime descrambler which IPPV tier is supported on the channel. On IPPV programs, this defines the IPPV access rights. Access control via the IPPV tiers is enabled by use of the IPPV bit in the program rekey message.

Each channel controller 14, 15 generates file of past IPPV programs. These files are required by the business data processors 10, 11 for determination of debit, generation of itemized bills, and validation of incoming view history. Each such file should cover a certain period of time, ideally a month, but more realistically probably a week. Each file should identify the IPPV programmer and the file's position within the sequence of files generated by the channel controller so that the business data processor 10, 11 can be sure it has all the program history data in sequence.

Each program record in the file should contain the program ID, the program name, the program cost, and the program's IPPV authorization tier byte Program records should be in chronological order of transmission, with the oldest program first. A program covered by a free preview epoch and a purchase epoch is regarded as a single program and should be recorded only once. They can be written to the program history database at any time after the program starts.

Enabling and disabling of IPPV capabilities is done solely by the IPPV data management system 17, 47 through a new transaction. Authorization tier changes are to have immediate effect, and therefore always cause regeneration of any and all stored category rekey messages, and cause the category rekey message to be placed in the high priority queue. The new values are propagated until they are changed or until the unit is removed from the message lists.

Setting of IPPV credit is done solely by the IPPV data management system 17, 47 through a new transaction. Credit changes are to have immediate effect, and therefore cause regeneration of any and all stored category rekey messages and cause a category rekey message to be placed in the high priority queue. The new value is propagated until it is changed or until the unit is removed from the message lists.

The IPPV data management system 17, 47 maintains a descrambler unit database that contains data required to support descrambler unit features and capabilities within the scope of the overall IPPV data management system functionality. Creation of new unit records occur as a result of authorization transactions from either the business data processors or the console for the IPPV data management system 17, 47.

The IPPV data management system 17, 47 supports removal of a business data processor 10, 11 from the IPPV data management system 17, 47. For each descrambler, all services that previously were authorized by the business data processor 10, 11 being removed are deauthorized and their view histories are collected. Once all descramblers have been deauthorized for IPPV programming services authorized by the removed business data processor 10, 11, and their view histories have been collected and stored on an upload tape, the IPPV data management system 17, 47 removes the record of the removed business data processor 10, 11 from its database.

The IPPV data management system 17, 47 also supports removal of a specified IPPV programming service for a given business data processor 10, 11. In this case, the descrambler units are deauthorized for only the removed service.

It is also possible to place a specific service for a business data processor 10, 11 in a "frozen" state. All transactions requesting authorization of a service in this state for a business data processor 10, 11 shall be rejected. However, deauthorization transactions are supported and view history data is collected.

Hence, for a business data processor, each IPPV programming service may have one of four states: not authorized, authorized, frozen, and terminated.

Termination of services is entered as a request to the IPPV data management system 17, 47. Upon receiving this request, the IPPV data management system 17, 47 initiates a background task to traverse the descrambler unit database, deauthorizing all units authorized for the service corresponding to the service symbol and collecting their view history. Once all descrambler units have been deauthorized for the terminated service and their view histories collected, the IPPV data management system 17, 47 removes the service from the list of current services. While the IPPV data management system 17, 47 is in the process of terminating a service, the service is designated in a "terminated" state, and the IPPV data management system 17, 47 prohibits any new authorization actions involving the service.

The IPPV data management system 17, 47 supports authorization and deauthorization of descrambler units for IPPV programming services. Authorization and deauthorization of services are specified in terms of the applicable service symbols. Authorization or deauthorization of services by the IPPV data management system 17, 47 is immediate. Alternatively it could be possible to request authorization or deauthorization of a service to take effect for some future date.

Authorization and deauthorization of a descrambler unit is possible from any business data processor 10, 11 or from the console of the IPPV data management system 17, 47. When by a business data processor 10, 11, the authorization/deauthorization request is checked by the descrambler message generator 45, 56 system allow only transactions for services that the requesting business data processor 10, 11 is authorized for. An authorization or deauthorization request from a business data processor 10, 11 may apply to specified individual IPPV programming services or to all of services authorized by the business data processor.

For descrambler unit authorization, descrambler message generator 45, 56 builds a composite authorization mask by ORing the current authorization mask with the new authorization mask corresponding to specified service symbol. The resulting composite authorization mask is transmitted by the descrambler message generator 45, 56 to the respective message controller 18, 48.

For descrambler unit deauthorization, the descrambler message generator 45, 56 removes from the current authorization mask those tier bit(s) corresponding to the service(s) which are being deauthorized. The authorization mask resulting from a deauthorization action is transmitted by the descrambler message generator 45, 56 to the respective message controller 18, 48.

The IPPV data descrambler message generator 45, 56 maintains at least the following basic authorization information about each descrambler: (a) a list of IPPV programming services the descrambler is authorized to descramble; and (b) the data on which the descrambler was last authorized for each service.

The IPPV data descrambler message generator 45, 56 maintains at least the following basic credit information about each descrambler: (a) a show count limit set by each business data processor 10, 11; (b) the credit advance limit set by each business data processor 10, 11 and (c) the dates the showcount limit and the credit advance limit were last updated.

When descramblers are first authorized for an IPPV service, the descrambler message generator sends a polling message to the descramblers 21, 51 connected to reporting devices 23 53, requiring the reporting devices 23, 53 to report, thereby confirming that the reporting path is alive. The reporting device is required to report any change of view history or debit authenticator, but only when polled.

The view history data authenication, sorting and distribution system 43, 52 stores the view history data in a database organized by descrambler address, showing, for each view history record: (a) the channel identifier (IPPV provider ID); (b) the IPPV program ID; (c) the associated showcount; (d) whether the view history has been uploaded to a business data processor 10, 11; and (e) the data and time the view history record was received. The view history data authentication, sorting and distribution system 43, 52 checks the showcount data for consistency, and generates an exception report when an inconsistency is found.

If view history data is received from an unknown descrambler unit, a new unit record is created for it, and an exception report is generated. The view history is included in any view history unload tapes created for the business data processor responsible for the services identified in such view history.

The business data processors 10, 11 can access all view history data for IPPV programming services respectively authorized by such business data processors 10, 11.

I claim:

1. A distribution control system for controlling the distribution of scrambled impulse pay per view (IPPV) programming from a plurality of different IPPV programmers to a plurality of descramblers that individually may be authorized to descramble an individual IPPV program upon processing of a cost data signal for the program and a credit data signal for the descrambler and upon processing of an IPPV status data signal for the program and an authorization data signal for the descrambler, and that individually provide view history data signals identifying descrambled IPPV programs, the distribution control system comprising
   a plurality of business data processing systems for processing view history data signals and credit data signals for individual descramblers and cost data signals for IPPV programs provided by given IPPV programmers and for providing credit data signals and IPPV authorization data signals pertaining to individual descramblers;
   a plurality of channel control systems respectively related to a plurality of the given IPPV programmers for providing descrambler messages containing identification, cost and IPPV status data signals for individual IPPV programs; and
   an IPPV data management system for processing the credit data signals and IPPV authorization data signals provided by the business data processing systems to provide descrambler messages unique to each descrambler containing credit data signals and IPPV authorization data signals pertaining to the individual descrambler, for sorting the IPPV program identification and cost data signals provided by the channel control systems in accordance with which business data processing systems process data signals for those IPPV programs provided by the respective given IPPV programmers, for sorting view history data signals provided by the descramblers in accordance with which business data processing systems process data signals for the respective descramblers for the IPPV programmers that provide the IPPV programs identified in the view history data signals provided by the respective descramblers, and for forwarding the sorted IPPV program identification and cost data signals and the sorted view history data signals to the respective business data processing systems.

2. A system according to claim 1, wherein the IPPV data management system sorts view history data signals in accordance with a scheme wherein the view history data signals from a given descrambler for a given IPPV programmer is forwarded to only one business data processing system.

3. A system according to claim 1, further comprising a plurality of said IPPV data management systems coupled to said plurality of business data processing systems and said plurality of channel control systems,
   wherein all data signals pertaining to any given descrambler is processed by a single said IPPV data management system.

4. A system according to claim 1, for controlling the distribution of IPPV programming to descramblers that individually may be authorized to descramble a given IPPV program upon processing of a cost data signal for the program and a credit data signal for the descrambler only when said IPPV status data signal identifies the given IPPV program as being authorized for purchase and the authorization data signal for the descrambler indicates that purchase of IPPV programs provided by the programmer providing said given IPPV program is authorized,
   wherein each of the individual descrambler messages provided by the IPPV data management system contain a plurality of tier authorization bits, with the position of each bit identifying a tier of IPPV programs and each bit indicating whether purchase by the individual descrambler is authorized for the tier of IPPV programs identified by such bit; and
   wherein the descrambler messages provided by a plurality of the channel control systems for a respective plurality of different IPPV programmers each contains an IPPV status bit in a respectively different position for processing with the tier authorization bits of the individual descrambler message, with each IPPV status bit indicating whether or not purchase of IPPV programming provided by the respective IPPV programmer is authorized.

5. A system according to claim 1, for controlling the distribution of IPPV programming to descramblers that individually may be authorized to descramble a given IPPV program upon processing of a cost data signal for the program and a credit data signal for the descrambler only when said IPPV status data signal identifies the given IPPV program as being authorized for purchase and the authorization data signal for the descrambler indicates that purchase of IPPV programs provided by the programmer providing said given IPPV program is authorized,
   wherein each of the individual descrambler messages provided by the IPPV data management system contain a plurality of tier authorization bits, with the position of each bit identifying a tier of IPPV programs and each bit indicating whether purchase by the individual descrambler is authorized for the tier of IPPV programs identified by such bit; and wherein the descrambler messages provided by a group of the channel control systems contain an IPPV status bit in a position for processing with a common one of the tier authorization bits of the individual descrambler message, with the IPPV status bit indicating whether or not purchase of an IPPV program is authorized.

6. A distribution control system for controlling the distribution of scrambled impulse pay per view (IPPV) television programming from a plurality of different IPPV programmers to a plurality of descramblers that individually may be authorized to descramble a given IPPV program upon processing of an IPPV status data signal for the program and an authorization data signal for the descrambler only when said IPPV status data signal identifies the given IPPV program as being authorized for purchase and the authorization data signal for the descrambler indicates that purchase of IPPV programs provided by the programmer providing said given IPPV program is authorized, comprising a plurality of business data processing systems for providing IPPV authorization data signals for a plurality of different IPPV programmers pertaining to individual descramblers;

a plurality of channel control systems respectively related to a plurality of the given IPPV programmers for providing descrambler messages containing IPPV status data signals for individual IPPV programs; and an IPPV data management system for processing the IPPV authorization data signals provided by the business data processing systems to provide descrambler messages unique to each descrambler containing IPPV authorization data signals pertaining to the individual descrambler;

wherein each of the individual descrambler messages provided by the IPPV data management system contain a plurality of tier authorization bits, with the position of each bit identifying a tier of IPPV programs and each bit indicating whether purchase by the individual descrambler is authorized for the tier of IPPV programs identified by such bit; and wherein the descrambler messages provided by a plurality of the channel control systems for a respective plurality of different IPPV programmers each contains an IPPV status bit in a respectively different position for processing with the tier authorization bits of the individual descrambler message, with each IPPV status bit indicating whether or not purchase of IPPV programming provided by the respective IPPV programmer is authorized.

7. A distribution control system for controlling the distribution of scrambled impulse pay per view (IPPV) television programming from a plurality of different IPPV programmers to a plurality of descramblers that individually may be authorized to descramble a given IPPV program upon processing of an IPPV status data signal for the program and an authorization data signal for the descrambler only when said IPPV status data signal identifies the given IPPV program as being authorized for purchase and the authorization data signal for the descrambler indicates that purchase of IPPV programs provided by the programmer providing said given IPPV program is authorized, comprising a plurality of business data processing systems for providing IPPV authorization data signals for a plurality of different IPPV programmers pertaining to individual descramblers;

a plurality of channel control systems respectively related to a plurality of the given IPPV programmers for providing descrambler messages containing IPPV status data signals for individual IPPV programs; and an IPPV data management system for processing the IPPV authorization data signals provided by the business data processing systems to provide descrambler messages unique to each descrambler containing IPPV authorization data signals pertaining to the individual descrambler;

wherein each of the individual descrambler messages provided by the IPPV data management system contain a plurality of tier authorization bits, with the position of each bit identifying a tier of IPPV programs and each bit indicating whether purchase by the individual descrambler is authorized for the tier of IPPV programs identified by such bit; and wherein the descrambler messages provided by a group of the channel control systems contain an IPPV status bit in a position for processing with a common one of the tier authorization bits of the individual descrambler message, with the IPPV status bit indicating whether or not purchase of an IPPV program is authorized.

8. A distribution control system for controlling the distribution of scrambled impulse pay per view (IPPV) programming from a plurality of different IPPV programmers to a plurality of descramblers that individually may be authorized to descramble an individual IPPV program upon processing of a cost data signal for the program and a credit data signal for the descrambler, and that individually provide view history data signals identifying descrambled IPPV programs, the distribution control system comprising a plurality of business data processing systems for processing view history data signals and credit data signals for individual descramblers and cost data signals for IPPV programs provided by given IPPV programmers and for providing credit data signals pertaining to individual descramblers;

a plurality of channel control systems respectively related to a plurality of the given IPPV programmers for providing descrambler messages containing identification and cost data signals for individual IPPV programs; and an IPPV data management system for processing the credit data signals provided by the business data processing systems to provide descrambler messages unique to each descrambler containing credit data signals pertaining to the individual descramblers, for sorting the IPPV program identification and cost data signals provided by the channel control systems in accordance with which business data processing systems process data signals for those IPPV programs provided by the respective given IPPV programmers, for sorting view history data signals provided by the descramblers in accordance with which business data processing systems process data signals for the respective descramblers and which given IPPV programmers provide the IPPV programs identified in the view history data signals provided by the respective descramblers, and for forwarding the sorted IPPV program identification and cost data signals and the sorted view history data signals to the respective business data processing systems.

9. In combination, a plurality of descramblers that individually may be authorized to descramble an individual scrambled impulse pay per view (IPPV) program from at least one of a plurality of different IPPV programmers upon processing of a cost data signal for the program and a credit data signal for the descrambler and upon processing of an IPPV status data signal for the program and an authorization data signal for the descrambler, and that individually provide view history data signals identifying descrambled IPPV programs, a plurality of business data processing systems for processing view history data signals and credit data signals for individual descramblers and cost data signals for IPPV programs provided by given IPPV programmers and for providing credit data signals and IPPV authorization data signals pertaining to individual descramblers;

a plurality of channel control systems respectively related to a plurality of the given IPPV programmers for providing descrambler messages containing identification, cost and IPPV status data signals for individual IPPV programs; and an IPPV data management system for processing the credit data signals and IPPV authorization data signals provided by the business data processing systems to provide descrambler messages unique to each descrambler containing credit data signals and IPPV authorization data signals pertaining to the individual descrambler, for sorting the IPPV program identification and cost data signals provided by the channel control systems in accordance with which business data processing systems process data signals for those IPPV programs provided by the respective given IPPV programmers, for sorting view history data signals provided by the descramblers in accordance with which business data processing systems process data signals for the respective descramblers for the IPPV programmers that provide the IPPV programs identified in the view history data signals provided by the respective descramblers, and for forwarding the sorted IPPV program identification and cost data signals and the sorted view history data signals to the respective business data processing systems.

* * * * *